United States Patent [19]
Keith

[11] 3,872,366
[45] Mar. 18, 1975

[54] MOTOR CONTROL CIRCUIT
[75] Inventor: James Duncan Keith, Mount Wolf, Pa.
[73] Assignee: Rockwell International Corporation, Pittsburgh, Pa.
[22] Filed: May 21, 1973
[21] Appl. No.: 362,166

[52] U.S. Cl. .................. 318/331, 318/332, 318/349
[51] Int. Cl. .......................................... H02p 5/16
[58] Field of Search ........... 318/331, 332, 315, 317, 318/349

[56] References Cited
UNITED STATES PATENTS
| | | | |
|---|---|---|---|
| 3,584,282 | 6/1971 | Reeves | 318/332 |
| 3,737,748 | 6/1973 | Teders | 318/331 |
| 3,745,439 | 7/1973 | Belmuth | 318/332 |

Primary Examiner—Robert K. Schaefer
Assistant Examiner—John J. Feldhaus

[57] ABSTRACT

A D.C. motor control circuit having a speed reference potentiometer connected to the base of a transistor such that as the base of the transistor becomes more positive, the collector of the transistor becomes more negative thereby accomplishing phase inversion, the collector of the transistor is connected to a programmable unijunction transistor via a first diode and a first resistor such that as the collector of the transistor becomes lower in potential the gate of the programmable unijunction will in a like manner become lower in potential thereby causing the programmable unijunction transistor to turn on earlier in the cycle, the output pulse of the programmable unijunction transistor will therefore be advanced in phase, the cathode of the programmable unijunction transistor being connected to the gates of a plurality of silicon controlled rectifiers via second and third resistors such that as the programmable unijunction transistor is turned on the silicon controlled rectifiers will fire respectively in each alternate half-cycle resulting in a higher voltage being applied to the armature of the motor being controlled, the armature being connected to the silicon controlled rectifiers, a feedback signal current is taken from the negative terminal of the armature of the motor and the signal current is fed via a fourth resistor to the base of the transistor thereby generating a feedback current, the armature voltage will continue to increase until the feedback current equals the reference current generated by the speed reference potentiometer, the speed potentiometer signal is also fed to the base of the transistor, thereby effecting stable voltage regulation of the motor being controlled.

7 Claims, 1 Drawing Figure

▽ DENOTES COMMON CONNECTION

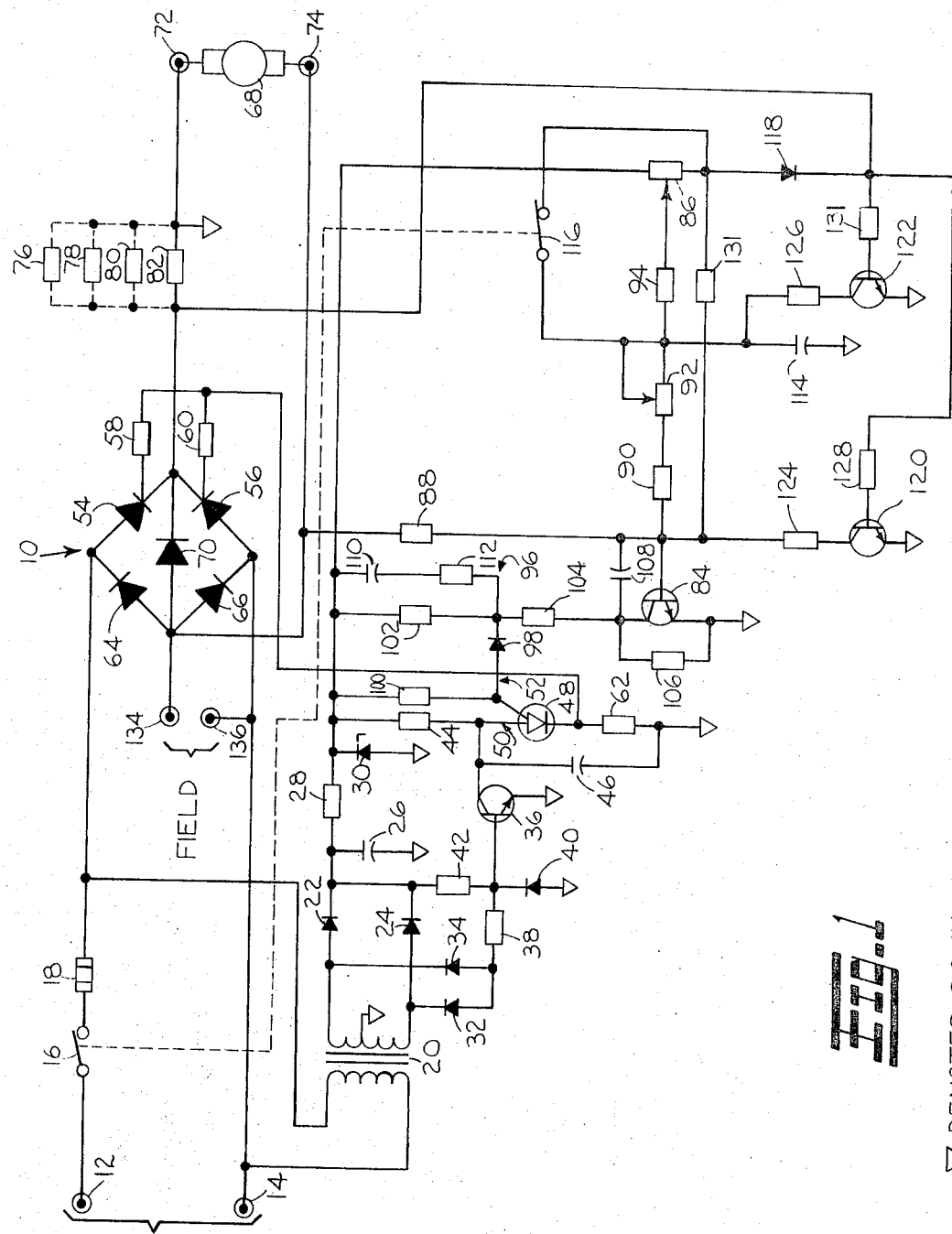

MOTOR CONTROL CIRCUIT

BACKGROUND OF THE INVENTION

The present invention relates to motor control circuits and in particular to D.C. motor control circuits. The prior art D.C. motor control circuits are many in form and have various deficiencies. Typically, the prior art forms of D.C. motor control circuits cannot be used on motors with different horsepower ratings without substantial readjustment and modification. Additionally, the prior art forms of D.C. motor control circuits are particularly difficult to adjust; for example, most of the prior art D.C. motors control circuits include individual adjustments for IR compensation and for current limiting. Accordingly, in these types of circuits, maximum and minimum speed adjustments and IR compensation adjustments interact with each other thus making adjustment of the overall circuit difficult.

Current sensing resistors typically used in the prior art forms of D.C. motor control circuits were selected for a particular horsepower rating such as one-half horsepower. As a currrent sensing resistor was selected to give an adequate feedback signal for a low horsepower motor, the power dissipation in the current sensing resistor would be extremely high to be practical if the circuit was to be connected to control a larger D.C. motor. Another basic deficiency of the prior art forms of D.C. motor control circuits is that they are highly complex utilizing a number of expensive and energy absorbing components. Typically, such circuits would include two transformers. One for D.C. power supply isolation and the other for silicon controlled rectifier gate isolation.

SUMMARY OF THE INVENTION

Accordingly, it is a primary object of the present invention to provide a D.C. motor control circuit having a speed reference potentiometer connected to the base of a transistor such that as the base of the transistor becomes more positive, the collector of the transistor becomes more negative thereby accomplishing phase inversion, the collector of the transistor is connected to a programmable unijunction transistor via a first diode and a first resistor such that as the collector of the transistor becomes lower in potential the gate of the programmable unijunction will in a like manner become lower in potentialthereby causing the programmable unijunction transistor to turn on earlier in the cycle, the output pulse of the programmable unijunction transistor will therefore be advanced in phase, the cathode of the programmable unijunction transistor being connected to the gates of a plurality of silicon controlled rectifiers via second nd third resistors such that as the programmable unijunctin transistor is turned on the silicon controlled rectifiers will fire respectively in each alternate half-cycle resulting in a higher voltage being applied to the armature of the motor being controlled, the armature being connected to the silicon controlled rectifiers, a feedback signal current is taken from the negative terminal of the armature of the motor, the positive terminal being common, and the signal current is fed via a fourth resistor to the base of the transistor thereby generating a feedback current, the armature voltage will continue to increase until the feedback equals the reference current generated by the speed reference potentiometer, the speed reference potentiometer signal is also fed to the base of the transistor, thereby effecting stable voltage regulation of the motor being controlled.

It is an additional object of the present invention to provide a D.C. motor control circuit with IR compensation in accordance with claim 1 wherein at least on current sensing resistor is connected to the cathode of a second diode, the second diode elevates the potential of the feedback current signal such that the anode of the second diode is close in voltage to the base voltage of the transistor such that under motor no-load conditions there is no voltage drop across a fifth resistor which is connected between the base of the transistor and the anode of the diode, as the current in the armature increases the potential developed across the current sensing resistor raises the potential at the anode to generate a reference current through the fifth resistor which is directly proportional to motor current and torque, the increase of the proportional to current will cause an increase in the armature voltage thereby maintaining speed regulation.

It is a further object of the present invention to provide a simple variable speed D.C. motor control circuit capable of being inexpensively manufactured utilizing high volume techniques.

It is yet another object of the present invention to provide a D.C. motor control cituit utilizing standard A.C. power line input.

It is yet another object of the present invention to provide a D.C. motor control circuit having superior speed regulation utilizing IR compensation.

It is still another object of the present invention to provide a D.C. motor control circuit having the capability of accommodating motors with various horsepower ratings without readjustments or modification.

It is another object of the present invention to provie a D.C. motor control circuit having current limit for overload protection.

It is still another object of the invention to provide a D.C. motor control circuit having a minium of adjustments.

It is a further object of the present invention to provide a D.C. motor control circuit being relatively small in size, compact, and having low power dissipation particularly in the current sensing resistor portion of the circuit.

Other objects and advantages of the invention will become apparent as the present invention is better understood from the following disclosure and as shown in the accompanying drawing.

DESCRIPTION OF THE DRAWING

The accompanying drawing, referred herein and constituting a part thereof, illustrate an embodiment of the invention, and together with the description, serve to explain the principles of the invention.

In the Drawing:

FIG. 1 is a schematic drawing of the D.C. motor control circuit in accordance with the present invention.

DESCRIPTION OF THE INVENTION

Referring now to FIG. 1 therein shown as improved and unique D.C. motor control circuit 10 embodying the present invention.

The following description to be most meaningful has been broken down into the various major working sections and/or functions of the D.C. motor control circuit 10.

One major section of the D.C. motor control circuit 10 is the power supply section.

Alternating current (A.C.) is applied to the D.C. motor control circuit 10 at a terminal 12 and terminal 14. Typically the alternating current would be 120 volts, 60 cycle A.C.

A switching means such as "on and off" switch 16 is provided to control the flow of current from the terminals 12 and 14.

To protect the D.C. motor control circuit and its associated equipment there is provided a fuse 18. The fuse 18 could be so rated to interrupt the flow of current in the event of a current fault.

A transformer is connected across the terminals 12 and 14 to provide isolation from line voltage and to further provide a step-down of the line voltage to preselected power voltage appropriate for the direct current supply.

The output of the transformer 20 is inputted to diodes 22 and 24 to provide an output therefrom of a full wave rectifier direct current power supply with a positive output potential.

A capacitor 26 is connected between diodes 22 and 24 and, to filter the direct current power supply filter.

Resistor 28 is connected to a zener diode 30 and they form a shunt regulator which regulates at the zener voltage of zener diode 30.

The power supply section of the D.C. motor control circuit thereby provides a precisely regulated D.C. voltage to the lower voltage circuitry.

Another major section of the D.C. motor control circuit 10 is the SCR (Silicon Controlled Rectifier) firing circuit.

Transformer 20 has its output also connected to two diode 32 and 34 to provide an output therefrom of a full wave rectified direct current power supply with a negative output potential. This particular output is not filtered.

The full wave rectified direct current power thereby generated is inputted to a synchronizing transistor 36 through a resistor 38. The resistor 38 limits the base current of the synchronizing transistor 36 to the appropriate and safe level.

The resistor 38 is also connected to a diode 40. Diodes 40 is provided to prevent excessive reverse base-to-emitter potential on the synchronizing transistor 36.

Resistor 42 connected to each of the diodes 22 and 24 provides the positive bias to the base of the synchronizing transistor 36.

A resistor 44 is provided with a capacitor 46 to form a charging circuit. The charging circuit generates a sawtooth output wave form. The capacitor 46 is discharged each half-cycle by the synchronizing transistor 36.

The synchronizing transistor 36 is energized or turned on when the positive current through the resistor 42 exceeds the negative current through the resistor 38. The positive current through the resistor 42 exceeds the negative current through the resistor 38 when the alternating line or supply current passes through zero potential.

A programmable unijunction transistor 48 is provided in the circuit 10. To assist in the understanding of the operative interaction of the programmable unijunction with the rest of the D.C. motor control circuit 10 two particular points of the circuit have been denoted 50 and 52. The programmable unijunction transistor 48 will not become operative until the potential at point 50 exceeds the potential at point 52 by a small voltage value. The value of the potential differential is approximately 0.6 volts.

When the programmable unijunction transistor 48 is activated or turned on capacitor 46 is discharged into the gate terminals of silicon controlled rectifier 54 and silicon controlled rectifier 56. The discharge of the current from the programmable unijunction transistor 48 is passed through two resistors 58 and 60 before it flows to the gate terminals of the silicon controlled rectifiers 54 and 56 respectively. The resistors 58 and 60 equalize the so discharged current flowing to the gate terminals of the silicon controlled rectifiers 54 and 56.

The resistor 62 returns the gate terminals of the silicon controlled rectifiers 54 and 56 to common when the programmable unijunctin transistor 48 is not in its turned on stage. The transistor 36 communicates the programmable unijunction transistor 48 when the line voltage crosses through zero potential.

The particular point at which the programmabble unijunction transistor 48 turns on in relation to the line voltage zero crossing is determined by the potential at the point 52 in the control circuit 10. If, for example, the potential at point 52 in control circuit 10 is relatively high, the programmable unijunction transistor 48 will not turn on until a late stage in the cycle when the potential at point 50 exceeds the potential at point 52. This essentially is due to the relatively long time period for the capacitor 46 to charge to that level of potential. Similarly, and in a like fashion, the opposite is also true. That is, when the potentialat point 52 is relatively low, the programmable unijunction transistor 48 will be turned on at a relatively early point in the cycle.

Another major or substantial section of the D.C. motor control circuit 10 is the semiconverter bridge.

The semiconverter bridge generally describes and includes rectifier 64 and rectifier 66, as well as silcon control rectifier 54 and 56. This section of the D.C. motor control circuit is to be referred to as the main power section which switches the potential to the D.C. motor 68.

Silicon control rectifier 54 along with rectifier 66 and silicon control rectifier 56 along with rectifier 64 respectively operate for alternate half-cycles. Rectifier 70 is a freewheeling or commutation diode which conducts the current resulting from the discharge of the inductance in motor 68 at the end of the cycle. This current flows only for a brief period when the silicon rectifiers 54 and 56 stop conducting.

The power is applied to the motor 68 at the terminals 72 and 74. It can be seen that the motor current must pass through current resistors 76, 78 and 80 and 82. The resistors 76, 78, and 80 and 82 may commonly be referred to as current sensing resistors. They are of a low resistance value such that the potential developed across them is only in a range of a few tenths of a volt. This relatively small potential developed across the resistors 76, 78, 80 and 82 is proportional to the armature current in the motor 68. As will be seen, this small potential may be used for the functions of current limiting and IR compensation.

As above noted, another major component part of the D.C. motor control circuit 10 is the error amplifier. The transistor 84 may be considered the only active part of the error amplifier. Its function is basically to sum a reference current from the potentiometer 86 with a feedback current. This feedback current is derived at the negative terminal, that is terminal 74 of the motor 68. The feedback current flows through resistor 88. The potentiometer 86 is the basic speed reference control. The wiper of the potentiometer 86 taps off a potential which corresponds to the desired or preselected speed of the motor 68.

Resistors 90, 92 and 94 all form a current from the potentiometer 86 to the base of the transistor 84. Resistor 92 is adjustable. The adjustable characteristic of resistor 92 enables it to adjust the current source in order to set the maximum speed of the motor 68. Adjustable resistor 92 may be classified or termed as the maximum speed adjustment.

When the reference current flowing through the resistors 90, 92 and 94 exceeds the feedback current through resistor 88, the base potential of the transistor 84 will increase. This action will cause the collector potential of the transistor 84 to decrease.

Referring now to the point in the control circuit 10 designated as point 96, it can be seen that the above action pulls the potential down to a lower potential. Further, at reference point 52, the error voltage point is coupled to the potential via resistor 104 at reference point 96 via diode 98. Diode 98 is forward-biased from the current flowing through resistor 100. Accordingly, there is normally a low potential developed across diode 98. As the potential at reference point 52 drops the voltage in motor 68 will increase because the programmable unijunction transistor developed across diode 98. As the potential at reference point 52 drops the voltage in motor 68 will increase because the programmable unijunction transistor 48 turns on earlier in the cycle thereby causing more voltage in motor 68 will increase because the programmable unijunction transistor 48 turns on earlier in the cycle thereby causing more voltage to be applied to the motor 68 by the semiconverter bridge.

This higher potential across the motor 68 will, in turn, cause a greater feedback current through resistor 88. It can be seen that when the feedback current equal the reference current, the system is in a state of equilibrium.

The base current of the transistor 84 is substantially negligible in relation to the reference current such that it has no effect on the overall circuit. Resistor 100 is a "pull-up" resistor and is adapted to pull the potential at reference point 52 up to where the diode 98 is forward-biased. The diode 98 is required for isolation to prevent the programmable unijunction transistor 48 from shorting circuit point 96 to a common potential. The programmable unijunction transistor 48 has the characteristics of and is adapted to short all the terminals together when it is turned on.

Resistor 102 may be characterized as the collector load resistor for the transistor 84. Resistor 104 is adapted to present the potential at reference point 96 from ever dropping below a prescribed level when the transistor 84 is in a fully saturated state. This particular circuit configuration is necessary to prevent the programmable unijunction transistor 48 from turning on too early in the cycle.

Resistor 106 is used to bias reference point 96 at a potentiaal near the active region of programmable unijunction 48, when the transistor 84 is fully cut-off.

Capacitor 108 is of an integrator-type capacitor and is adapted to reduce the rate of change of the potential at the collector of the transistor 84. This particular circuit configuration increases the overall stability of the circuit.

Capacitor 110 is adapted to pull the potential at reference point 96 above the active region of the programmable unijunction transistor 48 when the D.C. motor control circuit 10 is energized by turning switch 16 on. This particular circuit configuration affects the projection of a malfunction when the D.C. motor control circuit 10 is initially energized or turned on.

Resistor 112 is adapted to isolate capacitor 110 from the reference point 96 in such a manner as to prevent capacitor 110 from exceptionally slowing down the rate of change of the potential at reference point 96.

Capacitor 114 has the particular function of controlling the rate of change of the current and thereby provides a controlled rate of acceleration of the motor 68. A switch 116 is interlocked or ganged together with switch 16.

Accordingly, the switch 116 will short out capacitor 114 through diode 118 when the switch 16 is turned off. This action ensures that the capacitor 114 is in a discharged state prior to energizing the D.C. motor control circuit 10.

An important function or objective of the D.C. motor control circuit 10 is to achieve limiting. When a shunt-wound direct current motor 68 is overloaded, the current in the armature of the motor 68 will become excessive. Accordingly, it is extremely important to prevent damage to both the D.C. motor control circuit and its associated D.C. motor 68. Current limiting is thereby employed to avoid this catastrophic event.

Transistor 120 and transistor 122 are provided in the D.C. motor control circuit 10 to accomplish the current limiting objective. When the current in the motor 68 becomes excessive, the voltage drop across the current resistors 76, 78, 80 and 82 is sufficient to result in the turning on of the transistor 120 and the transistor 122.

Transistor 120 is turned on to reduce the base to emitter voltage on the transistor 84. This will in turn cause the collector potential of the transistor 84 to increase. This increase will then cause the programmable unijunction transistor 48 to turn on later in its cycle thereby resulting in less voltage being applied to motor 68. It can be seen therefore, with the reduced voltage on motor 68 that there will be correspondingly reduced current also. Resistor 124 is adapted to limit the current flowing out of the base circuit of the transistor 84 in order to prevent the rate of change of the collector voltage from becoming excessive. In a correspondingly similar matter, transistor 122 discharges the capacitor 114 through resistor 126 such that the reference current applied to the base of transistor 84 will be reduced. This will also result in a lower voltage being applied to motor 68. Resistor 126 is provided at the D.C. control circuit 10 to prevent the capacitor 114 from becoming discharged at a too rapid rate which could result in a decrease of instability. Resistors 128 and 131 are adapted to prevent any excessive base current iin the transistors 120 and 122, respectively.

Another essential function of the D.C. motor control circuit 10 in accordance with the present invention is to achieve IR compensation. Due to inherent electrical energy losses encountered in the motor 68, mere speed regulation with changing load situations is not entirely satisfactory in all applications. Accordingly, to compensate for small speed variations when the motor 68 in its loaded state, a small amount of positive feedback may be used to increase the motor voltage under such load conditions. Current sensing resistors 76, 78, 80, 82 and resistor 130, as well as diode 118, are utilized in the D.C. motor control circuit 10 to accomplish this very purpose.

The small potential, which is directly proportional to the current in the motor 68, is developed across current sensing resistors 76, 78, 80 and 82 and is applied to the cathode of diode 118. The diode 118 acts essentially as a level translator and it increases the D.C. level of the small potential developed across the aforesaid current sensing resistors 76, 78, 80 and 82. The diode 118 so increase the D.C. level up to a level close to the base to emitter potential of the transistor 84.

The potential of these two levels is substantially close together such that under no-load conditions, no current will flow through the resistor 130.

When motor current flows, the small potential developed across the current sensing resistors 76, 78, 80 and 82 is also developed across resistor 130 such that a small amount of current will flow. The resistance of the resistor 130 will determine the amount of this current. It can be seen that this current adds to the existing reference current flowing through resistors 90, 92 and 94 such that the potential developed across the motor 68 will actually be at a higher level in the loaded condition than it is in the no-load or unload condition.

One can determine the manner in which the field supply is developed by first referring to terminals 134 and 136. Terminals 134 and 136 are connected to the field of the motor 68 in order to provide the required direct current field power supply. It can be seen that diode 64 acts as a rectifier and diode 66 acts as a rectifier and diode 66 acts as a freewheeling diode to conduct current in the alternate half-cycle. The inductance of the field in the motor 68 is sufficient to keep the "ripple" effect relatively low.

It can be seen from the above description that the SCR firing circuit employing the programmable unijunction transistor 48 is particularly and ideally suited to this application. This is true because it may be directly coupled to the silicon controlled rectifier gates without the necessity of the usual pulse transformer. It also utilizes a negative going error signal at reference point 52 which ideally suits the silicon controlled rectifier firing circuit for control with a single NPN transistor error amplifier with the common emitter configuration. Additionally, the D.C. motor control circuit 10 is a substantial departure from the prior art in that it uniquely embodies a level translator diode 118. This results in greatly improved speed regulation and eliminates the necessity for an IR compensation adjustment. It also eliminates the necessity for a minimum speed adjustment and further reduces the necessary feedback potential level developed across the current sensing resistors 76, 78, 80 and 82. The reduction in the level of potential has the additional benefit of reducing the power dissipated in current sensing resistors 76, 78, 80 and 82. In the prior art forms of D.C. motor control circuits, the heat dissipated in the current sense resistor has been a continuing problem. Additionally, the prior art forms of D.C. motor control circuits involve interacting adjustments. That is, when one adjustment was made to the control circuit, it had a definite effect on the adjustment of the circuit thereby rendering any adjustment difficult to achieve.

It should also be pointed out that multiple calibrated current sense resistors have not been used in this form in any prior art D.C. motor control circuit. One essential purpose for this is that a motor of a substantially lower horsepower rating may be connected to the same motor control circuit. The prior art forms of D.C. motor control circuits would have to have an individual current limit adjustment, an individual IR compensation adjustment, an individual minimum speed adjustment changed to suit the particular motor being controlled. This, of course requires test equipment and facilities.

With the multiple calibrated resistors, certain resistors are merely physically isolated or cut out from the system. No special adjustment is necessary because it can be predetermined that variations of resistance is necessary for the proper operation of the control circuit as it relates to the controlled motor.

In this manner, the D.C. motor control circuit 10 in accordance with the present invention may be used with various rated D.C. motors. Additionally, the control circuit embodying the present invention keeps the power dissipation in each current resistor the same for each motor horsepower used. In the prior art forms of D.C. motor control circuits, the resistance of the current sense resistors was made at a high enough level to provide adequate feedback voltage with the smallest motor used and then the power rating was made sufficiently high enough to suit the largest motor to be controlled. This, of course, increased the necessary power rating of the current sense resistor.

There is thus provided a unique electrical circuit which provides a substantial advance over the prior art. While particular embodiments of the present invention have been shown and described. It will be obvious to those skilled in the art that changes and mofifications may be made from this invention without departing from its broader aspects. Accordingly, the appended claims are to cover all such changes and modifications as they fall within the true spirit and scope of the invention.

I claim:

1. A D.C. motor control circuit having means for applying a selectively variable reference current supplied by a reference current generating means to the base of transistor having an emitter connected to common such that as the base of said transistor becomes more positive, the collector of said transistor becomes more negative thereby accomplishing phase invertion, said collector of said transistor is connected to a gate of a programmable unijunction transistor such that as the collector of said transistor becomes lower in potential the gate of the programmable unijunction will in a like manner become lower in potential thereby causing said programmable unijunction transistor having a ramp-shaped cyclic signal provided to the anode of said programmable unijunction transistor by a ramp-shaped cyclic signal producing means to turn on earlier in the cycle, the output pulse of said programmable unijunction transistor will therefore be advanced in phase, the cathode of said programmable unijunction transistor is turned on said silicon controlled rectifier will fire during a half-cycle of an A.C. power source which is synchronized with said rampshaped cyclic signal resulting in a higher voltage being applied to the armature of the motor being controlled, the armature being connected to said silicon controlled rectifier, a feedback signal current is taken from the negative terminal of said armature of said motor, the positive terminal of said armature being said common, and said signal current is fed via a first resistor to the base of the said transistor thereby generating a feedback current, the armature voltage will continue to increase until the feedback current substantially equals the reference current also being fed to the base of said transistor, thereby effecting stable voltage regulation of said motor being controlled.

2. A D. C. motor control circuit in accordance with claim 1 wherein at least one current sensing resistor is connected to the input side of a voltage level transistion means which elevates the potential of said feedback current signal such that an output side of said voltage level transistion means is close in voltage to the base voltage of said transistor such that under motor no-load conditions there is no voltage drop across a second resistor which is connected between the base of said transistor and said output side of said voltage level transistion means, as the current in said armature increases the potential developed across said current sensing resistor is also developed across said second resistor thus generating a second reference current directly proportional to motor current and torque, the increase of the second reference current will cause an increase in the armature voltage thereby maintaining speed regulation.

3. A D. C. motor control circuit in accordance with claim 2 including a plurality of said current sensing resistors connected in parallel.

4. A D.C. motor control circuit in accordance with claim 3 wherein each of said current sensing resistors are of different resistive value to provide suitable parallel resistance for the horse power rating of said motor being controlled.

5. A D.C. motor control circuit in accordance with claim 3 in which there are four current sensing resistors connected in parallel.

6. A D.C. motor control circuit in accordance with claim 2 in which said voltage level transition means is a diode and which said input side is the anode of said diode and said input side is the cathode of said diode.

7. A D.C. motor control circuit in accordance with claim 1 including another silicon controlled rectifier having a gate connected to said cathode of said programmable unijunction transistor so that it will fire during the other half-cycle of said A.C. power source which is also synchronized with said rampshaped cycle signal to apply voltage to said armature of said motor.

* * * * *